US012455634B2

(12) United States Patent
Okumura

(10) Patent No.: US 12,455,634 B2
(45) Date of Patent: Oct. 28, 2025

(54) INTERIOR MEMBER

(71) Applicants: TOKAI CHEMICAL INDUSTRIES, LTD., Gifu (JP); Sumitomo Riko Company Limited, Aichi (JP)

(72) Inventor: Takemasa Okumura, Aichi (JP)

(73) Assignees: TOKAI CHEMICAL INDUSTRIES, LTD., Gifu (JP); Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/608,845

(22) Filed: Mar. 18, 2024

(65) Prior Publication Data

US 2024/0220030 A1 Jul. 4, 2024

Related U.S. Application Data

(63) Continuation of application No. PCT/JP2023/012027, filed on Mar. 24, 2023.

(30) Foreign Application Priority Data

Mar. 30, 2022 (JP) ................................ 2022-055485

(51) Int. Cl.
*G06F 3/02* (2006.01)
*B60K 35/10* (2024.01)
(Continued)

(52) U.S. Cl.
CPC ............ *G06F 3/0202* (2013.01); *B60R 13/02* (2013.01); *B60R 13/0256* (2013.01);
(Continued)

(58) Field of Classification Search
CPC .. B60K 35/10; B60K 37/20; B60K 2360/143; B60K 2360/34; B60K 2360/345;
(Continued)

(56) References Cited

U.S. PATENT DOCUMENTS

2016/0317047 A1* 11/2016 Sugiyama ............... B60N 2/643
2020/0377036 A1* 12/2020 Lee ........................ A63F 13/245

FOREIGN PATENT DOCUMENTS

| JP | 2001061598 | | 3/2001 | |
| JP | 2001061598 | A * | 3/2001 | ............. B60N 2/002 |

(Continued)

OTHER PUBLICATIONS

"Written Opinion of the International Searching Authority (Form PCT/ISA/237) of PCT/JP2023/012027", mailed on Jun. 6, 2023, with English translation thereof, pp. 1-8.

(Continued)

*Primary Examiner* — Cory A Almeida
(74) *Attorney, Agent, or Firm* — JCIPRNET

(57) ABSTRACT

An interior member includes a first skin material, a second skin material, and transducers. The first skin material includes a first exposed part exposed to a cabin interior, and a first embedded part embedded on a cabin exterior side from the first exposed part. The second skin material includes a second exposed part exposed to the cabin interior and adjacent to the first exposed part, and a second embedded part embedded on the cabin exterior side from the second exposed part and joined to the first embedded part. The transducers each include a main body arranged directly back of the first exposed part, and a wiring part disposed directly back of at least the first embedded part and electrically connected to the main body. An end of each wiring part is disposed on the cabin exterior side of the first embedded part.

11 Claims, 8 Drawing Sheets

(51) Int. Cl.
    *B60K 37/20*     (2024.01)
    *B60R 13/02*     (2006.01)
    *H03K 17/98*     (2006.01)
(52) U.S. Cl.
    CPC .............. *H03K 17/98* (2013.01); *B60K 35/10*
            (2024.01); *B60K 37/20* (2024.01); *B60K*
        *2360/143* (2024.01); *B60K 2360/34* (2024.01);
            *B60K 2360/345* (2024.01); *B60K 2360/46*
            (2024.01); *B60K 2360/48* (2024.01); *B60R*
                *2013/0287* (2013.01); *H03K 2217/9651*
                    (2013.01); *H03K 2217/9653* (2013.01)
(58) Field of Classification Search
    CPC ................. B60K 2360/46; B60K 2360/48;
            B60R 13/02; B60R 13/0256; B60R
            2013/0287; G06F 3/0202; H03K 17/98;
            H03K 2217/9651; H03K 2217/9653
    See application file for complete search history.

(56) References Cited

FOREIGN PATENT DOCUMENTS

| | | | |
|---|---|---|---|
| JP | 2008067850 | | 3/2008 |
| JP | 2008067850 A | * | 3/2008 |
| JP | 2018167601 | | 11/2018 |
| JP | 2019188919 | | 10/2019 |

OTHER PUBLICATIONS

"International Search Report (Form PCT/ISA/210) of PCT/JP2023/012027", mailed on Jun. 6, 2023, with English translation thereof, pp. 1-4.
"Search Report of Europe Counterpart Application", issued on Dec. 19, 2024, p. 1-p. 8.
"Notice of Reasons for Refusal of Japan Counterpart Application", issued on May 27, 2025, with English translation thereof, pp. 1-5.

* cited by examiner

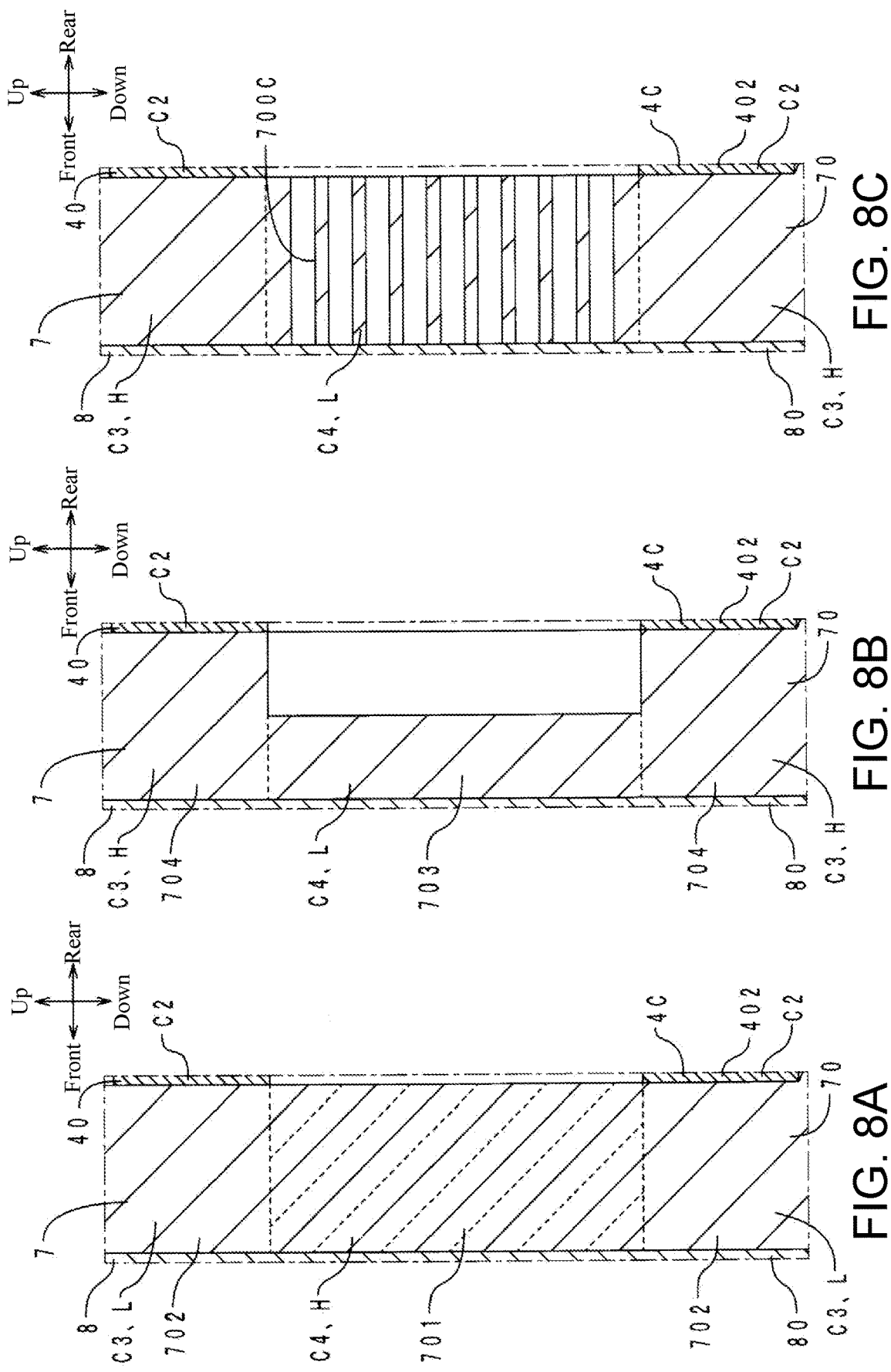

INTERIOR MEMBER

CROSS-REFERENCE TO RELATED APPLICATION

This application is a continuation of PCT International Application No. PCT/JP2023/012027, filed on Mar. 24, 2023, which claims priority under 35 U.S.C. § 119(a) to Japanese Patent Application No. 2022-055485, filed on Mar. 30, 2022. Each of the above application(s) is hereby expressly incorporated by reference, in its entirety, into the present application.

BACKGROUND

Technical Field

The present disclosure relates to an interior member with a skin material, which is used in, for example, the interior of a vehicle.

Related Art

In the field of vehicle interiors, the development of interior members in which switches for device operation are embedded is progressing. As an example, a lid of a console box of Japanese Patent Laid-open No. 2019-188919 includes, from the front side toward the back side, a skin material, a switch, and a base material. The skin material includes, from the front side toward the back side, a surface layer and a cushion layer.

On a front surface of the surface layer, a design (a large number of light spots arranged in a grid pattern) corresponding to the switch is displayed by backlighting. An operator is able to grasp a position of the switch by visually recognizing said design. By pressing said design, the operator is able to press the switch via the surface layer and the cushion layer.

The skin material bypasses the base material, that is, an outer edge of the lid, and is rolled from a front surface into a back surface of the base material. An end of the skin material is joined to the back surface of the base material. Along with the skin material, a wire connected to the switch bypasses the outer edge of the lid and is rolled from the front surface into the back surface of the base material. A cover member is adjacent to a lower side of the lid. The cover member covers an opening of a box body of the console box. The cover member is not exposed to a vehicle interior.

However, when the wire is routed to bypass the outer edge of the lid, a routing length (wire length) may be increased. That is, the wire may become redundant. The cushion layer is flexible. Hence, when the switch is disposed on the back side of the cushion layer, a pressing force from the operator is likely to be absorbed by the cushion layer. Accordingly, the pressing force is less likely to be transmitted to the switch. In this way, when the switch is disposed on the back side of the cushion layer, operability deteriorates. In this regard, operability can be improved when the switch is disposed on the front side of the cushion layer. However, in this way, the wire may also be disposed on the front side of the cushion layer. Hence, the operator is likely to recognize the wire through the surface layer by the tactile sense or the visual sense. Accordingly, the wire that is not directly related to operation of a device may cause deterioration of the tactile feel of the operator. The appearance of the lid may deteriorate and designability may be impaired. Accordingly, an object of the present disclosure is to provide an interior member in which a wiring part can be prevented from becoming redundant, the tactile feel can be prevented from deteriorating, and designability can be improved.

SUMMARY

An interior member of the present disclosure includes a first skin material, a second skin material, and a transducer. The first skin material includes: a first exposed part, exposed to a cabin interior; and a first embedded part, embedded on a cabin exterior side from the first exposed part. The second skin material includes: a second exposed part, exposed to the cabin interior and adjacent to the first exposed part; and a second embedded part, embedded on the cabin exterior side from the second exposed part and joined to the first embedded part. The transducer includes: a main body, disposed directly back of the first exposed part; and a wiring part, disposed directly back of at least the first embedded part and electrically connected to the main body. An end of the wiring part is disposed on the cabin exterior side of the first embedded part.

BRIEF DESCRIPTION OF THE DRAWINGS

FIG. 8A is a partial cross-sectional view in the up-down direction of an interior member of another embodiment (part 1). FIG. 8B is a partial cross-sectional view in the up-down direction of an interior member of another embodiment (part 2). FIG. 8C is a partial cross-sectional view in the up-down direction of an interior member of another embodiment (part 3).

DESCRIPTION OF THE EMBODIMENTS

According to the interior member of the present disclosure, the wiring part is routed using a joint portion between the first skin material and the second skin material. Hence, the wiring part can be prevented from becoming redundant compared to the case where the wiring part is routed to bypass an outer edge of the interior member. Since the wiring part can be prevented from becoming redundant, the operator is less likely to touch the wiring part and visually recognize the wiring part through the first skin material. Accordingly, the tactile feel can be prevented from deteriorating and designability can be improved.

Hereinafter, embodiments of an interior member of the present disclosure will be described.

First Embodiment

[Arrangement and Configuration of Interior Member]

Figure 1:
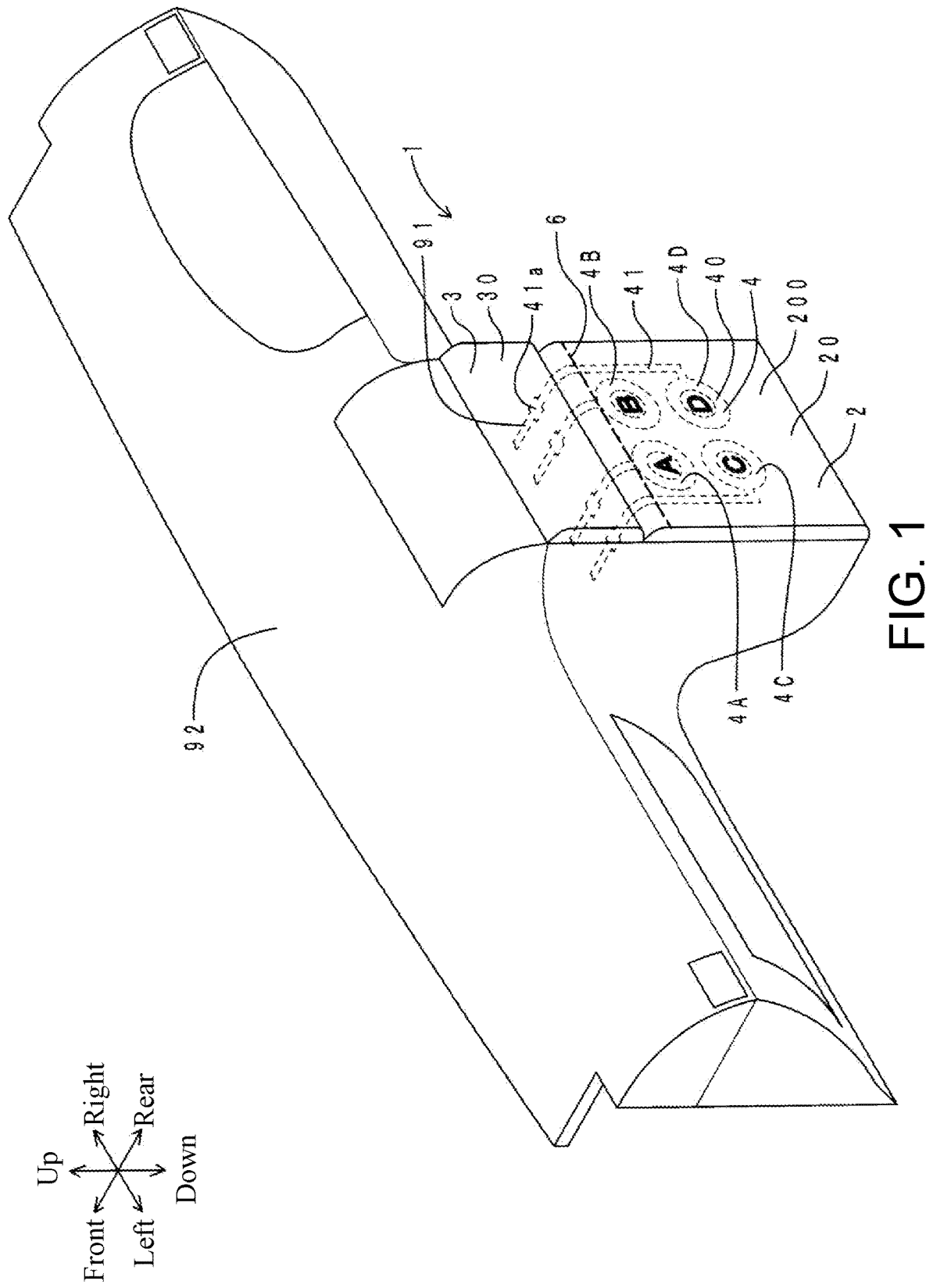
FIG. 1 is a layout diagram of an interior member of a first embodiment.
Figure 2:
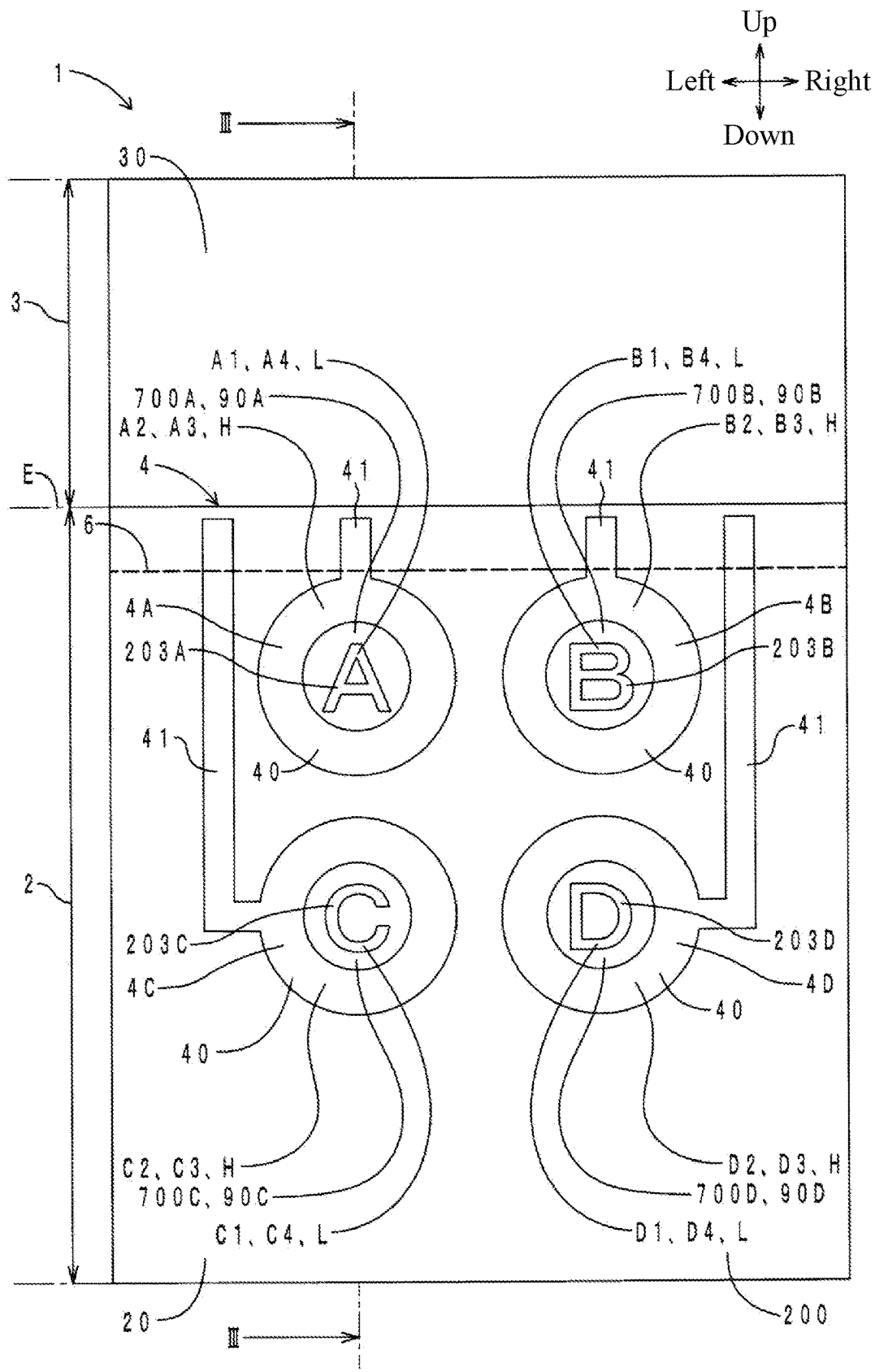
FIG. 2 is a transparent rear view of said interior member.
Figure 3:
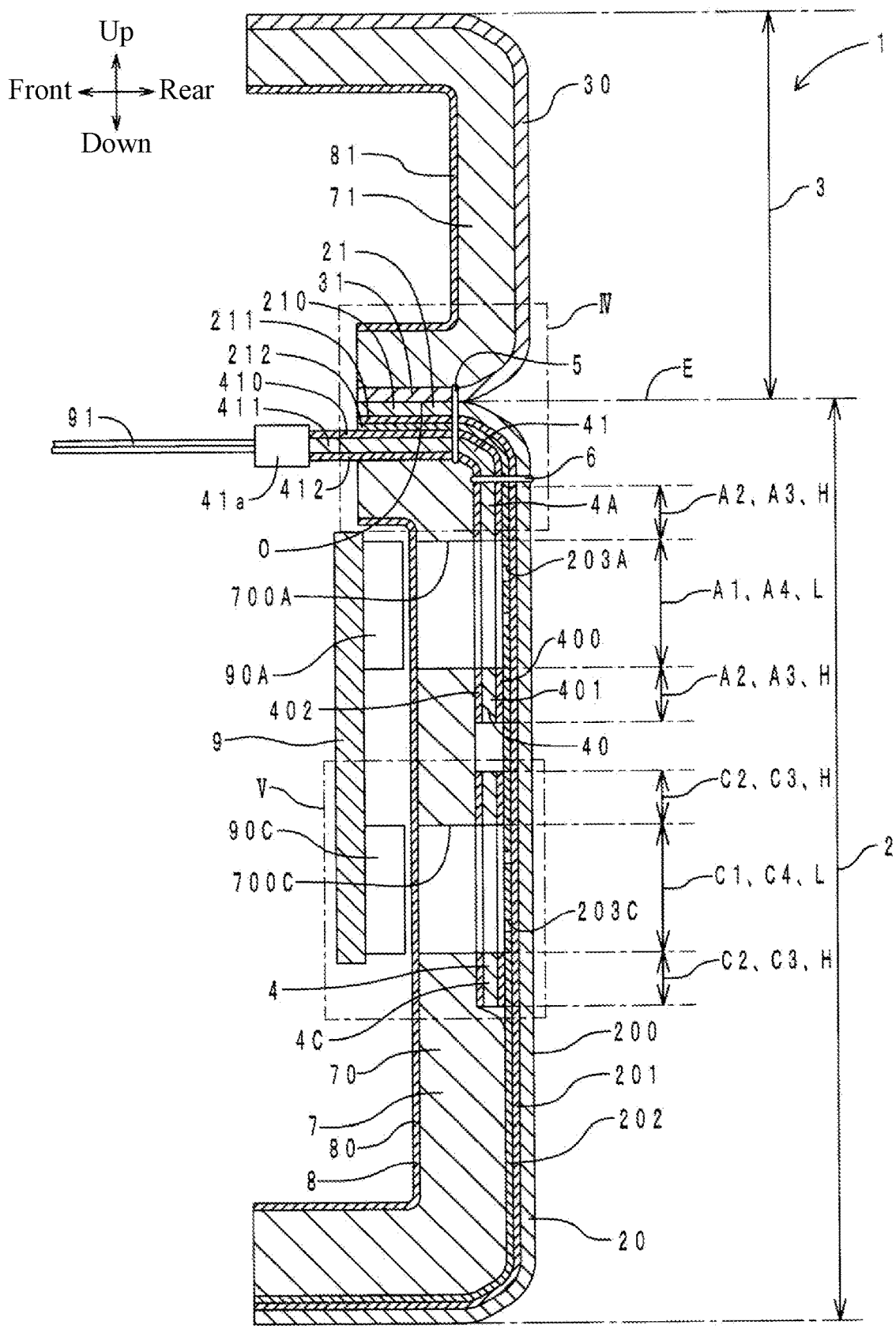
FIG. 3 is a cross-sectional view taken along III-III of FIG. 2.
Figure 4:
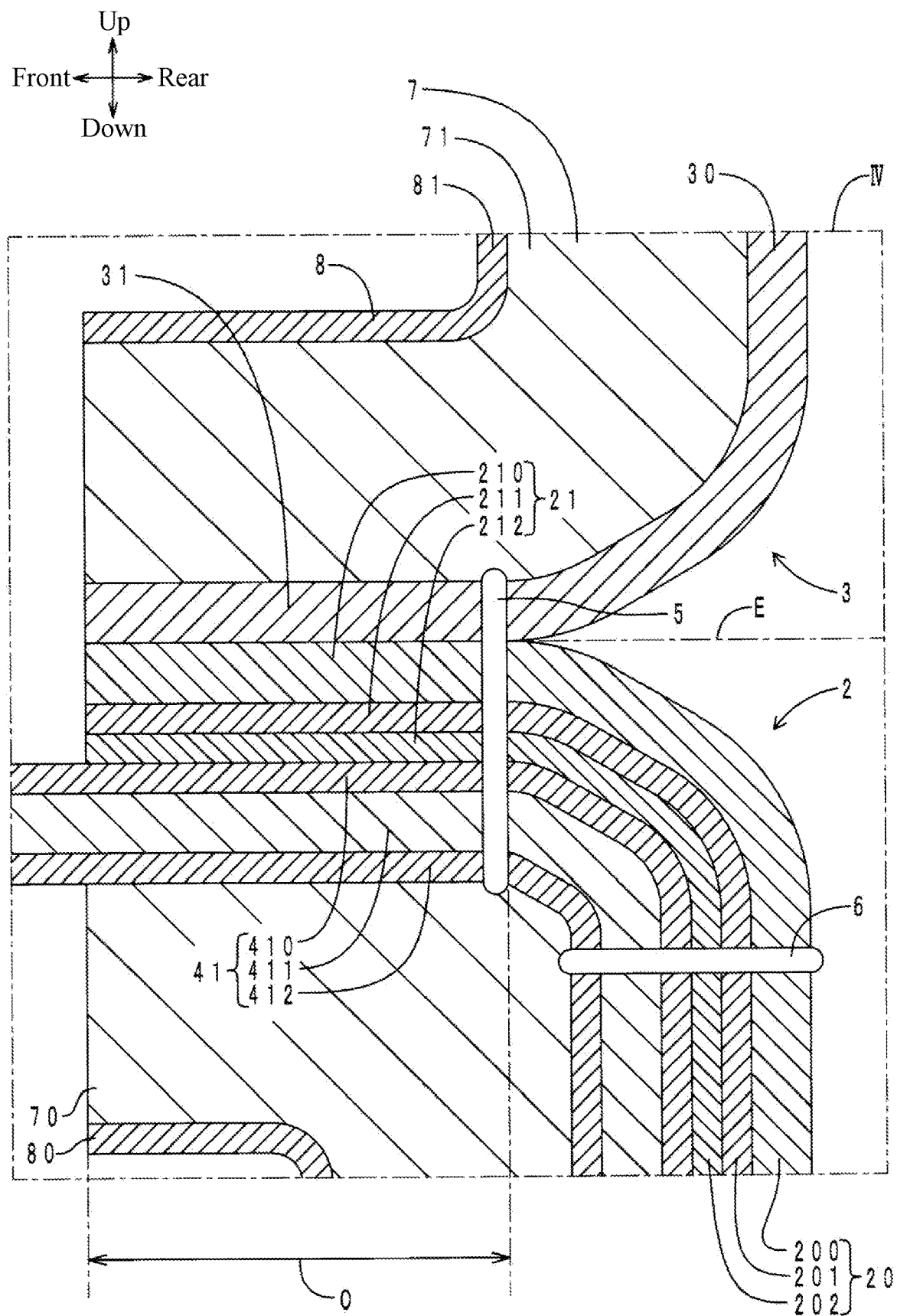
FIG. 4 is an enlarged view within a frame IV of FIG. 3.
Figure 5:
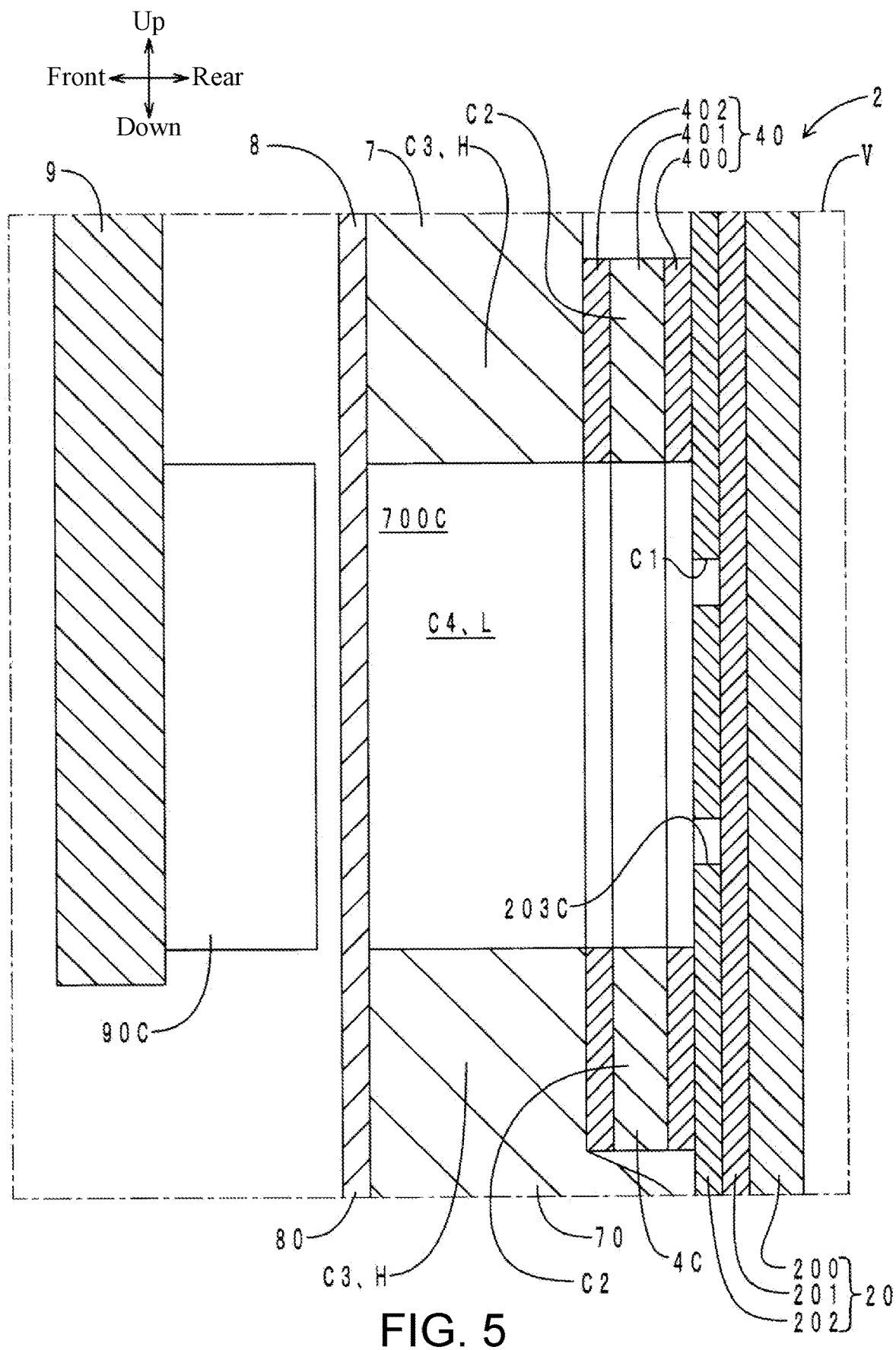
FIG. 5 is an enlarged view within a frame V of FIG. 3.

First, an arrangement and a configuration of an interior member of the present embodiment are described. In the drawings hereinafter, a rear side corresponds to a "cabin interior side" of the present disclosure, and a front side corresponds to a "cabin exterior side" of the present disclosure. FIG. 1 shows a layout diagram of the interior member of the present embodiment. FIG. 2 shows a transparent rear view (transparent front view) of said interior member. FIG. 3 shows a cross-sectional view taken along III-III of FIG. 2. FIG. 4 shows an enlarged view within a frame IV of FIG. 3. FIG. 5 shows an enlarged view within a frame V of FIG. 3. In FIG. 2, for convenience of description of a positional relationship between each member, display regions A1 to D1, a sensor part 4, light sources 90A to 90D and so on are shown as seen through a skin layer 200 and so on.

As shown in FIG. 1, an interior member 1 is disposed in a central portion in a left-right direction (vehicle width direction) of an instrument panel (interior part) 92 in a vehicle interior. That is, the interior member 1 is an interior member for vehicles. As shown in FIG. 2 to FIG. 5, the interior member 1 includes a first skin material 2, a second skin material 3, the sensor part 4, a first stitch 5, a second stitch 6, a flexible part 7, a base 8, and a light source part 9.

(First Skin Material 2)

The first skin material 2 includes a first exposed part 20 and a first embedded part 21. The first exposed part 20 is exposed to the vehicle interior (cabin interior). The first exposed part 20 is in the shape of a flexible sheet having a three-layer structure. That is, from a front side (rear side) toward a back side (front side), the first exposed part 20 includes a skin layer 200, an intermediate layer 201, and a design layer 202.

The skin layer 200 is made of synthetic leather and is layered. The skin layer 200 has a light transmitting property and flexibility. A front surface of the skin layer 200 is exposed to the vehicle interior. The intermediate layer 201 is disposed on the back side of the skin layer 200. The intermediate layer 201 is made of light transmitting ink and is layered. The intermediate layer 201 has a light transmitting property and flexibility. The intermediate layer 201 has a lower light transmitting property than the skin layer 200. That is, the intermediate layer 201 is semitransparent with a smoky tone. The intermediate layer 201 is colored transparent.

The design layer 202 is disposed on the back side of the intermediate layer 201. The design layer 202 is made of light non-transmitting ink and is layered. The design layer 202 has a light non-transmitting property and flexibility. In the design layer 202, four recesses 203A to 203D are disposed. The design layer 202 (excluding portions where the recesses 203A to 203D are disposed) does not transmit light.

The four recesses 203A to 203D open on a front surface and a back surface of the design layer 202. That is, the recesses 203A to 203D penetrate the design layer 202 in a front-back direction. Provided inside the recesses 203A to 203D is a space. The recesses 203A to 203D set the display regions A1 to D1 in the first exposed part 20. As shown in FIG. 2, as seen from the front side, a letter "A" is formed in the display region A1 (recess 203A), a letter "B" is formed in the display region B1 (recess 203B), a letter "C" is formed in the display region C1 (recess 203C), and a letter "D" is formed in the display region D1 (recess 203D). As shown in FIG. 3 and FIG. 5, in the first exposed part 20, the portions where the display regions A1 to D1 (recesses 203A to 203D) are set have a smaller thickness in the front-back direction than the other portions. Hence, light is likely to be transmitted therethrough. As shown in black in FIG. 1, by light irradiated from the back side, the display regions A1 to D1 display the predetermined designs "A" to "D" on the front surface of the skin layer 200 (that is, first exposed part 20).

The first embedded part 21 is embedded on the front side from an upper edge of the first exposed part 20. The first embedded part 21 is not exposed to the vehicle interior. The first embedded part 21 is integrally connected to the first exposed part 20. That is, like the first exposed part 20, the first embedded part 21 is in the shape of a flexible sheet having a three-layer structure. The first embedded part 21 includes, from a front side (upper side) toward a back side (lower side), a skin layer 210, an intermediate layer 211, and a design layer 212. The skin layer 210 and the skin layer 200 are made of the same material and are integrally connected; the intermediate layer 211 and the intermediate layer 201 are made of the same material and are integrally connected; the design layer 202 and the design layer 212 are made of the same material and are integrally connected.

(Second Skin Material 3)

The second skin material 3 is disposed on the upper side of and side by side with the first skin material 2. The second skin material 3 is made of synthetic leather and is in the shape of a sheet. The second skin material 3 includes a second exposed part 30 and a second embedded part 31. The second exposed part 30 is exposed to the vehicle interior. The second exposed part 30 is adjacent to the upper side of the first exposed part 20.

The second embedded part 31 is embedded on the front side from a lower edge of the second exposed part 30. The second embedded part 31 is not exposed to the vehicle interior. The second embedded part 31 is integrally connected to the second exposed part 30. The second embedded part 31 is disposed on the upper side of the first embedded part 21. As will be described later, the second embedded part 31 is joined to the first embedded part 21.

(Sensor Part 4)

The sensor part 4 is disposed on the back side of the first exposed part 20 and on the back side of the first embedded part 21. The sensor part 4 includes four sensors (switches for device operation) 4A to 4D. First, a configuration of the four sensors 4A to 4D is described. The four sensors 4A to 4D have similar configurations. The configuration of the sensor 4A is representatively described below.

The sensor 4A is a capacitive pressure sensor (load sensor). The sensor 4A is able to detect a load (pressing force from an operator) input from the front side (vehicle interior inner side). The load is included in the concept of "physical quantity" of the present disclosure. The sensor 4A includes a main body 40 and a wiring part 41.

The main body 40 is disposed on the back side of the first exposed part 20. As shown in FIG. 2, the main body 40 has an annular shape as seen from the front side. The main body 40 is in the shape of a flexible sheet having a three-layer structure. That is, as shown in FIG. 3 and FIG. 5, the main body 40 includes, from the front side toward the back side, a front-side electrode layer 400, an insulation layer 401, and a back-side electrode layer 402. The front-side electrode layer 400 is disposed on the back side of the design layer 202. The front-side electrode layer 400 is layered and has flexibility. The front-side electrode layer 400 includes a styrene-based thermoplastic elastomer and a conductive material containing carbon black.

The insulation layer 401 is disposed on the back side of the front-side electrode layer 400. The insulation layer 401 is layered and has flexibility. The insulation layer 401 includes a styrene-based elastomer and an olefin-based elastomer. The back-side electrode layer 402 is laminated on the back side of the insulation layer 401. The back-side electrode layer 402 is layered and has flexibility. The back-side electrode layer 402 is made of the same material as the front-side electrode layer 400.

As shown in FIG. 2, FIG. 3, and FIG. 5, input regions A2 to D2 are set in the main body 40. The input regions A2 to D2 extend over the entire main body 40. The input regions A2 to D2 have an annular shape as seen from the front side. The input regions A2 to D2 are disposed around the display regions A1 to D1 as seen from the front side. A load is input to the input regions A2 to D2 from the front side. Due to said load, the insulation layer 401 is elastically deformed, and an interelectrode distance (distance in the front-back direction between the front-side electrode layer 400 and the back-side electrode layer 402) changes. That is, the capacitance changes.

As shown by dotted lines in FIG. 1, the wiring part 41 is disposed on the back side of the first exposed part 20 and on the back side of the first embedded part 21. As shown in FIG. 2, the wiring part 41 has a band shape as seen from the front side. The wiring part 41 is integrally connected to the main body 40. That is, as shown in FIG. 3 and FIG. 4, like the main body 40, the wiring part 41 is in the shape of a flexible sheet having a three-layer structure. The wiring part 41 includes, from the front side toward the back side, a front-side wiring layer 410, an insulation layer 411, and a back-side wiring layer 412. The front-side wiring layer 410 and the front-side electrode layer 400 are made of the same material and are integrally connected; the insulation layer 411 and the insulation layer 401 are made of the same material and are integrally connected; the back-side wiring layer 412 and the back-side electrode layer 402 are made of the same material and are integrally connected.

As shown in FIG. 1 and FIG. 3, one end (rear end) of the wiring part 41 is connected to the main body 40. On the other hand, at the other end (front end) of the wiring part 41, a connector 41a is disposed. The connector 41a corresponds to an "end of a wiring part" of the present disclosure. The connector 41a is disposed on the front side of the first embedded part 21, the second embedded part 31, and the flexible part 7.

A control device (not illustrated) is disposed on the front side of the interior member 1. The connector 41a (specifically, front-side wiring layer 410 and back-side wiring layer 412) is electrically connected to the control device via a harness 91.

Next, an arrangement of the four sensors 4A to 4D is described. As shown by dotted lines in FIG. 1, the main bodies 40 of the four sensors 4A to 4D are disposed spaced apart at predetermined intervals in the up-down and left-right directions. The wiring parts 41 of the four sensors 4A to 4D are spaced apart at predetermined intervals in the left-right direction and extend in the up-down direction on the back side of the first exposed part 20. The wiring parts 41 of the four sensors 4A to 4D are spaced apart at predetermined intervals in the left-right direction and extend in the front-rear direction on the back side of the first embedded part 21.

(First Stitch 5)

The first stitch 5 is made of a thread. Like the second stitch 6 shown in FIG. 2, the first stitch 5 extends in the left-right direction. As shown in FIG. 4, the first stitch 5 sutures the wiring part 41, the first embedded part 21, and the second embedded part 31 from the lower side toward the upper side. Specifically, the first stitch 5 sutures (joins) the first embedded part 21 and the second embedded part 31. By the first embedded part 21 and the second embedded part 31 joined to each other, an embedded junction O is formed. Also, the first stitch 5 sews the wiring part 41 on a back surface of the first embedded part 21. That is, the wiring part 41 is positioned and fixed with respect to the first embedded part 21.

(Second Stitch 6)

The second stitch 6 is made of a thread. As shown in FIG. 2, the second stitch 6 extends in the left-right direction. As shown in FIG. 4, the second stitch 6 sutures the wiring part 41 and the first exposed part 20 from the front side (back side) toward the rear side (front side). Specifically, the second stitch 6 sews the wiring part 41 on a back surface of the first exposed part 20. That is, the wiring part 41 is positioned and fixed with respect to the first exposed part 20.

As shown in FIG. 2, as seen from the front side, the second stitch 6 is disposed between a boundary E and the main body 40, the boundary E being between the first exposed part 20 and the second exposed part 30. As shown in FIG. 4, the second stitch 6 protrudes to the rear side (vehicle interior inner side) with respect to the front surface of the first exposed part 20. As seen from the rear side, the second stitch 6 is in the shape of dotted lines long in the left-right direction. When the operator touches the first exposed part 20, the operator is able to distinguish between the skin layer 200 and the second stitch 6 by the tactile sense. That is, the second stitch 6 is tactilely recognizable from the front side of the first exposed part 20.

(Flexible Part 7)

The flexible part 7 includes a first flexible layer 70 and a second flexible layer 71. The first flexible layer 70 is disposed on the back side of the first skin material 2 and the sensor part 4. The first flexible layer 70 is made of a foam of a thermoplastic elastomer. The first flexible layer 70 is layered and has flexibility.

As shown in FIG. 2 and FIG. 3, four through holes 700A to 700D are opened in the first flexible layer 70. The through holes 700A to 700D serve as both "through holes" and "light introduction holes" of the present disclosure. The through holes 700A to 700D penetrate the first flexible layer 70 in the front-back direction.

As shown in FIG. 2, FIG. 3, and FIG. 5, in the first flexible layer 70, first regions A3 to D3 and second regions A4 to D4 are set. The first regions A3 to D3 are disposed on the back side of the input regions A2 to D2. The first regions A3 to D3 have an annular shape as seen from the front side. The first regions A3 to D3 are disposed around the display regions A1 to D1 as seen from the front side.

The second regions A4 to D4 are adjacent to the first regions A3 to D3. The second regions A4 to D4 are disposed radially inside the first regions A3 to D3 as seen from the front side. The second regions A4 to D4 are disposed on the back side of the display regions A1 to D1. The second regions A4 to D4 correspond to the through holes (spaces) 700A to 700D.

Here, the first regions A3 to D3 have higher hardness than the second regions A4 to D4. That is, the first regions A3 to D3 are a high hardness region H. The second regions A4 to D4 are a low hardness region L having lower hardness than the high hardness region H. The term "hardness" is, for example, hardness measured with an ASKER-C (durometer defined by SRISO101 (standards of the Society of Rubber Science and Technology, Japan)) hardness meter. The second flexible layer 71 is disposed on the back side of the second skin material 3. The second flexible layer 71 is layered and has flexibility. The second flexible layer 71 is made of the same material as the first flexible layer 70.

(Base 8 and Light Source Part 9)

The base 8 includes a first base material 80 and a second base material 81. The first base material 80 is disposed on the back side of the first flexible layer 70. The first base material 80 is made of resin and is layered. The first base material 80 has a light transmitting property and flexibility. The second base material 81 is disposed on the back side of the second flexible layer 71. The second base material 81 is layered and made of the same material as the first base material 80.

The light source part 9 is disposed on the back side of the base 8. As shown in FIG. 2 and FIG. 3, the light source part 9 includes the four light sources (LEDs) 90A to 90D. The light sources 90A to 90D are disposed on the back side of the through holes 700A to 700D, respectively. Front surfaces of the light sources 90A to 90D are each able to emit light over the entire surface.

As an example, when the display region C1 is focused, as shown in FIG. 5, the light from the light source 90C reaches the display region C1 via the base 8 and the through hole 700C. Said light reaches a front surface of the interior member 1 via the display region C1 (recess 203C), the intermediate layer 201, and the skin layer 200. Hence, as shown in FIG. 1, the design "C" is displayed on the front surface of the interior member 1.

[Method for Operating Interior Member]

Next, a method for operating the interior member of the present embodiment is described. The method for operating the interior member of the present embodiment is particularly suitable when the operator operates the interior member 1 while being unable to visually recognize the interior member 1. For example, the method is suitable when a vehicle driver operates an interior member (specifically, a device associated with an interior member) while driving.

During operation, the operator touches the front surface of the interior member 1 without visually recognizing the interior member 1. Here, the second stitch 6 and the first exposed part 20 (specifically, skin layer 200) are different in material. As shown in FIG. 4, the second stitch 6 (specifically, a rear end of the second stitch 6) protrudes from the front surface of the first exposed part 20. Hence, the operator is able to recognize the second stitch 6 by the tactile sense.

As shown in FIG. 2, the second stitch 6 is disposed on the upper side of and in close proximity to the input regions A2 to D2. The operator understands in advance a positional relationship between the second stitch 6 and the input regions A2 to D2. Hence, the operator is able to, on the basis of a position of the second stitch 6 recognized by the tactile sense, recognize (find out) positions of the desired input regions A2 to D2 by groping.

Also, as shown in FIG. 5, the first regions A3 to D3 directly back of the input regions A2 to D2 are the high hardness region H. On the other hand, the second regions A4 to D4 adjacent to the first regions A3 to D3 are the low hardness region L. Hence, the operator is able to, on the basis of a hardness difference between the high hardness region H and the low hardness region L, recognize the positions of the desired input regions A2 to D2 by groping.

In the case where the operator is able to visually recognize the interior member and the light sources 90A to 90D have been turned on, the operator is able to recognize the positions of the desired input regions A2 to D2 on the basis of the designs "A" to "D" displayed on the front surface of the first exposed part 20.

When the operator presses the desired input regions A2 to D2 (specifically, portions of the front surface of the first exposed part 20 having the desired input regions A2 to D2 disposed on the back side thereof), the main bodies (load detectors) 40 of the sensors 4A to 4D corresponding to the input regions A2 to D2 are compressed. Hence, the capacitance of the main bodies 40 increases. The control device drives the device (not illustrated) associated with the main bodies 40 based on a change in the capacitance of the main body 40. In this way, the interior member 1 of the present embodiment is operated.

[Effects]

Next, effects of the interior member of the present embodiment are described. A case is assumed where a skin material is an integral piece, and a wiring part is routed to a vehicle interior outer side of the interior member. In this case, it is necessary to route the wiring part via an outer edge of the skin material. For example, in the case where the first skin material 2 and the second skin material 3 shown in FIG. 3 are integrally connected in the up-down direction, it is necessary to route the wiring part 41 via a lower edge of the first skin material 2 or an upper edge of the second skin material 3.

In contrast, in the case of the interior member 1 of the present embodiment, as shown in FIG. 3, a skin material is composed of two divided bodies (first skin material 2 and second skin material 3). Hence, the wiring part 41 can be routed to a vehicle interior outer side (vehicle interior outer side of the first embedded part 21, the second embedded part 31, the first flexible layer 70, and the second flexible layer 71) of the interior member 1 using the boundary (joint portion or seam) E between the first skin material 2 and the second skin material 3. Accordingly, compared to the case where the skin material is an integral piece, the routing length can be reduced. Thus, the wiring part 41 can be prevented from becoming redundant. The influence (such as deterioration of detection accuracy) of noise (such as electrical resistance or stray capacitance) caused by redundancy of the wiring part 41 on the sensor part 4 can be suppressed.

As shown in FIG. 3 and FIG. 5, the front-side electrode layer 400 is disposed directly back of the design layer 202. That is, the main body 40 is disposed directly back of the first skin material 2 without via another layer (such as a flexible layer). Hence, the pressing force from the operator is likely to be transmitted to the main body 40. Accordingly, operability can be improved.

Here, as shown in FIG. 4, when the main body 40 is disposed directly back of the first skin material 2, the wiring part 41 is also disposed directly back of the first skin material 2. That is, the wiring part 41, which is not directly related to operation of a device, may cause deterioration of the tactile feel of the operator. In this regard, according to the interior member 1 of the present embodiment, the wiring part 41 can be prevented from becoming redundant, as described above. Hence, when the operator touches the interior member 1, the operator is less likely to recognize the wiring part 41. Accordingly, even if the wiring part 41 is disposed directly back of the first skin material 2, the tactile feel of the operator is less likely to deteriorate. Since the wiring part 41 can be prevented from becoming redundant, an outline of the wiring part 41 is less likely to appear (less noticeable) on a front surface of the first skin material 2. Hence, the operator is less likely to visually recognize the wiring part 41 through the first skin material 2. Accordingly, even if the wiring part 41 is disposed directly back of the first skin material 2, designability of the interior member 1 can be improved.

As shown in FIG. 3, the sensor part 4 is disposed on the back side of the first skin material 2. Hence, while the sensor part 4 can be prevented from being visually recognized from inside of the vehicle interior, the position of the sensor part 4 can be recognized by the tactile sense. Also, the sensor part 4 can be operated.

As shown in FIG. 4, the first stitch 5 sutures the first embedded part 21 and the second embedded part 31. Hence, the first embedded part 21 and the second embedded part 31 can be fixed. The first stitch 5 sews the wiring part 41 on the first embedded part 21. Hence, the wiring part 41 can be fixed to the first embedded part 21. An extension direction (left-right direction) of the first stitch 5 and an extension direction (front-rear direction) of the wiring part 41 intersect (are orthogonal to) each other. Hence, a length of a seam allowance can be reduced. Accordingly, an increase in wiring resistance can be suppressed. The first stitch 5 is disposed at the embedded junction O (specifically, a rear end of the embedded junction O). The first stitch 5 is not exposed to the vehicle interior. Hence, a good appearance is provided.

As shown in FIG. 4, the second stitch 6 is disposed in the first exposed part 20. The operator is able to recognize the second stitch 6 by the tactile sense. Hence, the operator is able to, on the basis of a position of the second stitch 6 recognized by the tactile sense, recognize the positions of the desired input regions A2 to D2. The second stitch 6 is in the shape of dotted lines. Hence, the operator is likely to recognize the second stitch 6 by the tactile sense.

As shown in FIG. 4, the second stitch 6 sews the wiring part 41 on the first exposed part 20. Hence, the wiring part 41 can be fixed to the first exposed part 20. An extension direction (left-right direction) of the second stitch 6 and an extension direction (up-down direction) of the wiring part 41 intersect (are orthogonal to) each other. Hence, a length of a seam allowance can be reduced. Accordingly, an increase in wiring resistance can be suppressed.

As shown in FIG. 3, the connector 41a is disposed on the vehicle interior outer side of the flexible part 7. That is, the wiring part 41 is routed using a boundary between the first flexible layer 70 and the second flexible layer 71. Hence, the wiring part 41 can be prevented from becoming redundant compared to the case where the wiring part 41 is routed to bypass the flexible part 7. The influence of noise caused by redundancy of the wiring part 41 on the sensor part 4 can be suppressed.

As shown in FIG. 2, FIG. 3, and FIG. 5, the first regions A3 to D3 directly back of the input regions A2 to D2 are the high hardness region H. On the other hand, the second regions A4 to D4 adjacent to the first regions A3 to D3 are the low hardness region L. The operator is able to recognize the hardness difference between the high hardness region H and the low hardness region L by the tactile sense from the front side of the first exposed part 20. Hence, the operator is able to recognize the positions of the desired input regions A2 to D2 on the basis of said hardness difference.

As shown in FIG. 2, FIG. 3, and FIG. 5, the second regions A4 to D4 (low hardness region L) include the through holes 700A to 700D. The through holes 700A to 700D penetrate the second regions A4 to D4 in the front-back direction. Hence, the hardness of the second regions A4 to D4 can be easily reduced.

The light sources 90A to 90D are disposed on the back side of the through holes 700A to 700D via the first base material 80. Also, the display regions A1 to D1 are disposed on the front side of the through holes 700A to 700D. Hence, the light from the light sources 90A to 90D can be irradiated to the display regions A1 to D1 from the back side. In this way, the through holes 700A to 700D function as the "light introduction holes" that introduce light into the display regions A1 to D1.

As shown in FIG. 3 and FIG. 5, the first exposed part 20 includes the intermediate layer 201 that is semitransparent. Hence, in the case where the light sources 90A to 90D are off (turned off), the designs "A" to "D" of the display regions A1 to D1 can be prevented from being displayed on the front surface of the first exposed part 20. On the other hand, in the case where the light sources 90A to 90D are on (turned on), assistance can be provided in displaying the designs "A" to "D" of the display regions A1 to D1 on the front surface of the first exposed part 20.

As shown in FIG. 3 and FIG. 5, the first flexible layer 70 is disposed on the back side of the sensor part 4. The first flexible layer 70 is made of an elastomer and has flexibility. Hence, the operator has a good tactile feel when touching the first skin material 2. The through holes 700A to 700D are opened in the first flexible layer 70. Hence, the first flexible layer 70 has a high light transmitting property.

As shown in FIG. 3 and FIG. 5, the first base material 80 is disposed on the back side of the first flexible layer 70. The first base material 80 has a light transmitting property. Hence, the light from the light sources 90A to 90D can be transmitted to the through holes 700A to 700D of the first flexible layer 70. The base 8 is harder than other parts (first skin material 2, second skin material 3, sensor part 4, first stitch 5, second stitch 6, and flexible part 7). Hence, the shape retention of the interior member 1 can be ensured.

As shown in FIG. 3 and FIG. 5, the light sources 90A to 90D and the through holes 700A to 700D are linearly connected in the front-back direction. Hence, a high light transmitting property is provided. The light sources 90A to 90D are LEDs. Hence, the light from the light sources 90A to 90D has high straightness (directionality). Accordingly, the light is likely to be introduced into the through holes 700A to 700D.

A front-side conductive layer (front-side electrode layer 400 and front-side wiring layer 410) and a back-side conductive layer (back-side electrode layer 402 and back-side wiring layer 412) include a styrene-based thermoplastic elastomer as an elastomer component. That is, a conductive layer (front-side conductive layer and back-side conductive layer) includes an elastomer component as a base material. Hence, the conductive layer is flexible.

Second Embodiment

An interior member of the present embodiment differs from the interior member of the first embodiment in that no first stitch is disposed, and that the second stitch does not fix the wiring part to the first exposed part. Here, only the differences will be described.

Figure 6:
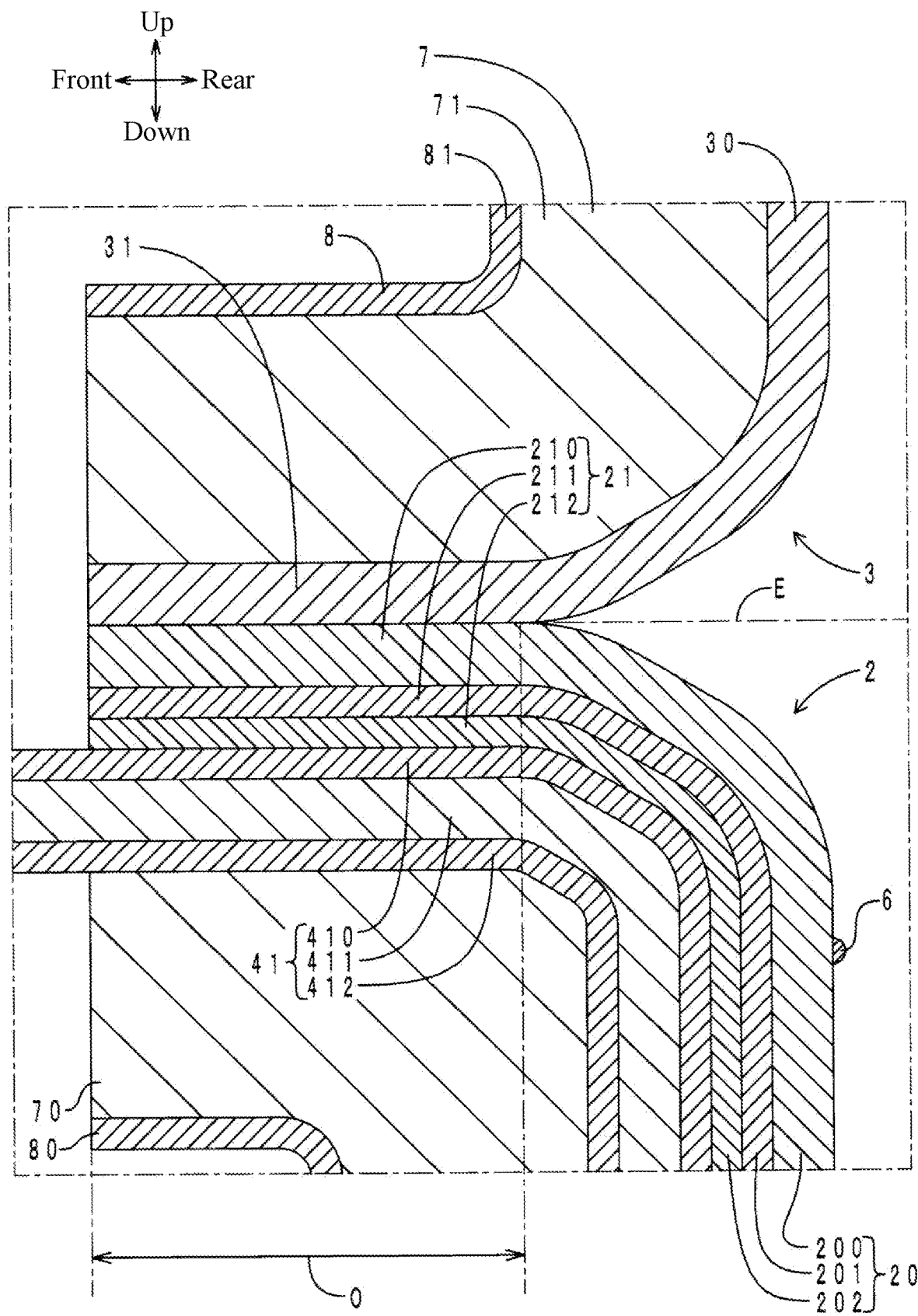
FIG. 6 is a partial cross-sectional view in an up-down direction of an interior member of a second embodiment.

FIG. 6 shows a partial cross-sectional view in the up-down direction of the interior member of the present embodiment. Portions corresponding to those in FIG. 4 are denoted by the same reference numerals. As shown in FIG. 6, there is no first stitch 5 (see FIG. 4) disposed at the embedded junction O. A front surface of the first embedded part 21 (skin layer 210) and a front surface of the second embedded part 31 are bonded. A front surface of the wiring part 41 (front-side wiring layer 410) is bonded to the back surface of the first embedded part 21 (design layer 212).

The second stitch 6 is a stitch-like molded product. That is, the second stitch 6 is a pseudo stitch. The second stitch 6 is fixed to the front surface of the first exposed part 20 (skin layer 200). The second stitch 6 protrudes from the front surface of the first exposed part 20. The front surface of the wiring part 41 (front-side wiring layer 410) is bonded to the back surface of the first exposed part 20 (design layer 202).

The interior member of the present embodiment and the interior member of the first embodiment have similar effects with respect to portions having common configurations. As in the interior member 1 of the present embodiment, the first stitch may not be disposed. That is, at the embedded junction O, the first embedded part 21 and the second embedded part 31 may be bonded together. The wiring part 41 may be bonded to the first embedded part 21. In this way, a seam allowance caused by the first stitch can be removed from the wiring part 41. Hence, an increase in wiring resistance can be suppressed.

The second stitch 6 may be a pseudo stitch. The wiring part 41 may be bonded to the first exposed part 20. In this way, a seam allowance caused by the second stitch 6 can be removed from the wiring part 41. Hence, an increase in wiring resistance can be suppressed. Even in this case, the operator is able to recognize the second stitch 6 by the tactile sense.

Third Embodiment

An interior member of the present embodiment differs from the interior member of the first embodiment in that a first region corresponds to a low hardness region and a second region corresponds to a high hardness region. Here, only the differences will be described.

Figure 7:
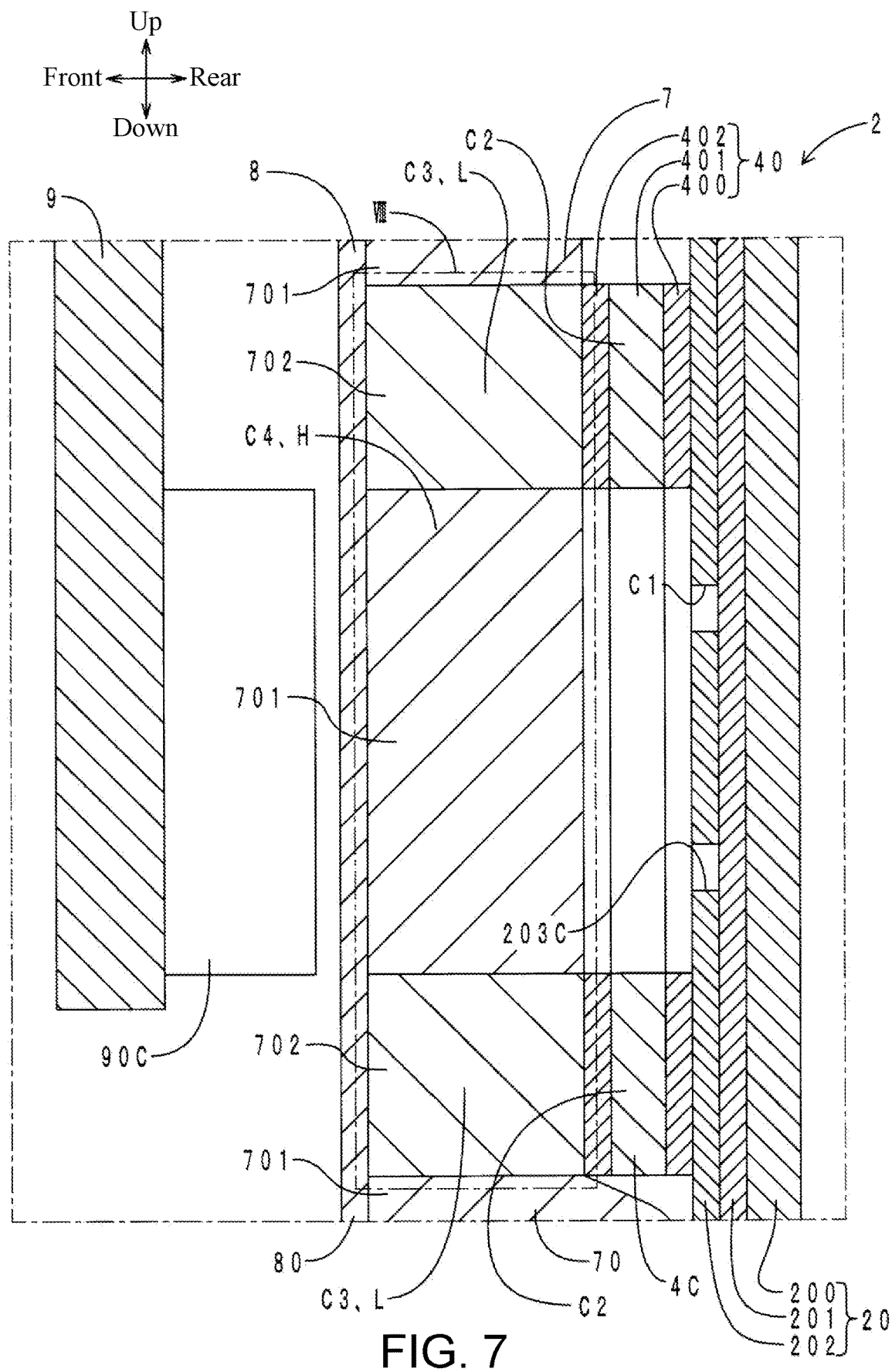
FIG. 7 is a partial cross-sectional view in the up-down direction of an interior member of a third embodiment.

FIG. 7 shows a partial cross-sectional view in the up-down direction of the interior member of the present embodiment. Portions corresponding to those in FIG. 5 are denoted by the same reference numerals. As shown in FIG. 7, the first flexible layer 70 includes a hard part 701 and a soft part 702. The hard part 701 and the soft part 702 are both made of an elastomer. The hard part 701 has higher hardness than the soft part 702. That is, a hardness difference is set between the hard part 701 and the soft part 702.

The soft part 702 has an annular shape as seen from the front side. The soft part 702 is disposed in the first region C3. Hence, the first region C3 is the low hardness region L. On the other hand, the hard part 701 is disposed in a portion other than the soft part 702 in the first flexible layer 70. Hence, the second region C4 is the high hardness region H. The hard part 701 has a light transmitting property. Hence, the light from the light source 90C is able to be transmitted through the hard part 701.

The interior member of the present embodiment and the interior member of the first embodiment have similar effects with respect to portions having common configurations. The first region C3 may be the low hardness region L as in the interior member 1 of the present embodiment. The second region C4 may be the high hardness region H. Even in this case, the operator is able to recognize the input region C2 by the tactile sense.

When the operator applies a pressing force to the input region C2 via the first exposed part 20, the first region C3 (low hardness region L) is compressed and deformed (sinks) to the back side. At this time, the second region C4 (high hardness region H) guides the compression and deformation of the first region C3 from radially inside. Hence, a deformation direction of the first region C3 is likely to be stabilized.

Others

The embodiments of the interior member of the present disclosure have been described above. However, embodiments are not particularly limited to the above embodiments. It is also possible to implement various modifications and improvements that can be made by those skilled in the art.

[Regarding Configuration]

FIG. 8A shows a partial cross-sectional view in the up-down direction of an interior member of another embodiment (part 1). FIG. 8B shows a partial cross-sectional view in the up-down direction of an interior member of another embodiment (part 2). FIG. 8C shows a partial cross-sectional view in the up-down direction of an interior member of another embodiment (part 3). Portions corresponding to those in FIG. 7 are denoted by the same reference numerals. Portions shown in FIG. 8A to FIG. 8C correspond to those within a frame VIII of FIG. 7.

As shown in FIG. 8A, the first flexible layer 70 of another embodiment (part 1) includes the hard part 701 and the soft part 702. The soft part 702 is made of a foam of an elastomer. The hard part 701 is integrally connected to the soft part 702. In the hard part 701, the foam forming the soft part 702 is impregnated with resin. That is, the hard part 701 is made of a foam impregnated with resin. According to the present embodiment, by partially impregnating the first flexible layer 70 with resin, the high hardness region H (second region C4) and the low hardness region L (first region C3) can be easily set. The amount of resin for impregnating the hard part 701 is not particularly limited. The soft part 702 (low hardness region L) may be impregnated with resin. It is sufficient if a difference in resin impregnation rate can be set between the hard part 701 and the soft part 702.

As shown in FIG. 8B, the first flexible layer 70 of another embodiment (part 2) includes a thin part 703 and a thick part 704. The thin part 703 has a smaller thickness in the front-back direction than the thick part 704. Hence, the thin part 703 has lower hardness than the thick part 704. Accordingly, the thin part 703 corresponds to the low hardness region L, and the thick part 704 corresponds to the high hardness region H. According to the present embodiment, by partially reducing the thickness in the front-back direction (front-rear direction) of the first flexible layer 70, the high hardness region H (first region C3) and the low hardness region L (second region C4) can be easily set. The thickness in the front-back direction of the thick part 704 (high hardness region H) may be made smaller than the original thickness in the front-back direction of the first flexible layer 70. It is sufficient if a difference in thickness in the front-back direction can be set between the thin part 703 and the thick part 704.

As shown in FIG. 8C, a plurality of through holes 700C are opened in the first flexible layer 70 of another embodiment (part 3). The through holes 700C penetrate the first flexible layer 70 in the front-back direction (front-rear direction). According to the present embodiment, by partially disposing the through hole 700C in the first flexible layer 70, the high hardness region H (first region C3) and the low hardness region L (second region C4) can be easily set. The through hole 700C may be disposed in the high hardness region H. The diameter, number disposed and shape of the through holes 700C are not particularly limited. It is sufficient if a difference in aperture ratio of the through hole 700C can be set between the high hardness region H and the low hardness region L.

The stitch type of the first stitch 5 shown in FIG. 4 is not particularly limited. Examples thereof may include straight stitch, chain stitch, fly stitch, blanket stitch, French knot stitch, cross stitch, back stitch, outline stitch, feather stitch, herringbone stitch, couching stitch, and chevron stitch. The number of the first stitch 5 disposed is not particularly limited. The number disposed may be single (single stitch) or plural (for example, double stitch). The same applies to the second stitch 6.

The first stitch 5 shown in FIG. 4 may be combined into the form shown in FIG. 6. That is, the first embedded part 21 and the second embedded part 31 may be bonded together, the wiring part 41 may be bonded to the first embedded part 21, and the wiring part 41, the first embedded part 21, and the second embedded part 31 may be sutured by the first stitch 5. In this way, a joining strength between the wiring part 41 and the first embedded part 21 and between the first embedded part 21 and the second embedded part 31 is increased.

As shown in FIG. 4, the first stitch 5 functions both as a "skin material joining member" that joins the first skin material 2 and the second skin material 3, and as a "first wiring part fixing member" that fixes the wiring part 41 to the first skin material 2. The second stitch 6 functions as a "second wiring part fixing member" that fixes the wiring part 41 to the first skin material 2. A stapler, a rivet or the like may be used as the "skin material joining member," the "first wiring part fixing member," and the "second wiring part fixing member."

The second stitch 6 functions as an "input position notification member" that indirectly informs the operator of the positions of the input regions A2 to D2. For example, the second stitch 6 (pseudo stitch) shown in FIG. 6 does not function as the "second wiring part fixing member," but only functions as the "input position notification member." A predetermined design may be three-dimensionally disposed on the front surface of the first exposed part 20 as the "input position notification member." Even in this case, the operator is able to recognize the design by the tactile sense. The predetermined design may be planarly disposed as the "input position notification member." Even in this case, by setting a difference in coefficient of friction between a front surface of the design and the front surface of the first exposed part 20, the operator is able to recognize the design by the tactile sense.

Here, examples of the design disposed as the "input position notification member" include at least one selected from a pattern (such as polka dot pattern, stripe pattern, lattice pattern, wood grain pattern, or marble pattern), a letter (such as alphabet, hiragana character, katakana character, kanji character, number, or braille character), a shape (such as dot, straight line, dotted lines, dash-dotted lines, polygon or circle), and a symbol (such as button for device operation, or icon indicating device status).

The second stitch 6 may not be disposed in the interior member 1. As shown in FIG. 3, the boundary E is sunk on the front side from the front surfaces (portions of the front surfaces that protrude most rearward) of the first exposed part 20 and the second exposed part 30. Hence, the operator is able to recognize the boundary E by the tactile sense. Accordingly, the operator is able to, on the basis of a position of the boundary E, recognize (find out) the positions of the desired input regions A2 to D2 by groping.

A bonding manner between the first embedded part 21 and the second embedded part 31 shown in FIG. 6 is not particularly limited. The first embedded part 21 and the second embedded part 31 may be directly bonded (including fusion bonded). The first embedded part 21 and the second embedded part 31 may be indirectly bonded via a bonding layer (which may be a single layer or multiple layers). The same applies to the bonding form between the wiring part 41 and the first embedded part 21 and the bonding form between the wiring part 41 and the first exposed part 20.

The first exposed part 20 and the first embedded part 21 may have the same or different configurations. For example, the first exposed part 20 may include the skin layer 200, the intermediate layer 201 and the design layer 202, while the first embedded part 21 may include only the skin layer 210. That is, the first embedded part 21 may not include the intermediate layer 211 and the design layer 212.

The configuration of the flexible part 7 is not particularly limited. The first flexible layer 70 and the second flexible layer 71 may be integrated into one piece. The configuration of the base 8 is not particularly limited. The first base material 80 and the second base material 81 may be integrated into one piece.

The configuration of the sensor part 4 is not particularly limited. The number of sensors 4A to 4D disposed may be single or plural. For example, in the case of the number of sensors 4A to 4D disposed is single, an intersection (portion where the front-side electrode layer 400, the insulation layer 401 and the back-side electrode layer 402 are laminated (see FIG. 5)) of a plurality of front-side electrode layers 400 of a band shape and a plurality of back-side electrode layers 402 of a band shape that are disposed in a grid pattern as seen from the front side may be set as the input regions A2 to D2.

The type of the sensors 4A to 4D is not particularly limited. Examples thereof may include capacitive sensor, resistive film sensor, strain gauge sensor, and piezoelectric effect sensor. It is sufficient if a physical quantity input by the operator touching the first exposed part 20 can be detected. The type of the physical quantity is not particularly limited. Examples thereof include length, mass, time, current, load, pressure, and energy.

As a "transducer" of the present disclosure, a tactile switch or an actuator may be disposed instead of the sensors 4A to 4D. As the actuator, for example, an electrostatic actuator, an electromagnetic actuator, or a piezoelectric actuator may be disposed. The electrostatic actuator may include the front-side electrode layer 400, the insulation layer 401, and the back-side electrode layer 402 (see FIG. 5).

The wiring part 41 shown in FIG. 6 may not include the insulation layer 411. It is sufficient if insulation between the front-side wiring layer 410 and the back-side wiring layer 412 can be ensured. The type of the front-side wiring layer 410 and the back-side wiring layer 412 is not particularly limited. Examples thereof may include a conductive sheet and a conductive wire. The configuration of the end of the wiring part 41 is not particularly limited. Examples thereof may include a connector, a coupler, and a terminal. The end may be the wiring part 41 itself (for example, an end of a conductive sheet or an end of a conductive wire).

As shown in FIG. 2, the sensor 4A includes the input region A2, the sensor 4B includes the input region B2, the sensor 4C includes the input region C2, and the sensor 4D includes the input region D2. The first region A3 is disposed on the back side of the input region A2, the first region B3 is disposed on the back side of the input region B2, the first region C3 is disposed on the back side of the input region C2, and the first region D3 is disposed on the back side of the input region D2. A hardness difference may be set between at least two of the first regions A3 to D3. In this case, any first region (for example, first regions A3 and B3 on the upper side) corresponds to the high hardness region H, and another first region (for example, first regions C3 and D3 on the lower side) corresponds to the low hardness region L. The method for setting the hardness difference applies to FIG. 5 and FIG. 8A to FIG. 8C.

The number disposed, position, size, shape and so on of the recesses 203A to 203D shown in FIG. 2, FIG. 3, and FIG. 5 are not particularly limited. The number of display regions A1 to D1 disposed and the number of recesses 203A to 203D disposed may be the same or different. For example, a single display region A1 to D1 may be formed by a plurality of recesses 203A to 203D. A plurality of display regions A1 to D1 may be formed by a single recess 203A to 203D. The positions of openings of the recesses 203A to 203D are not particularly limited. The recesses 203A to 203D may open on the front surface or the back surface of the design layer 202. In the case where the recesses 203A to 203D open on the front surface of the design layer 202, positions of bottoms of the recesses 203A to 203D may be within the design layer 202, on the front surface of the front-side electrode layer 400, within the front-side electrode layer 400, or the like. In the case where the recesses 203A to 203D open on the back surface of the design layer 202, the positions of the bottoms of the recesses 203A to 203D may be within the design layer 202, on the back surface of the intermediate layer 201, within the intermediate layer 201, or the like.

Among the intermediate layer 201, the design layer 202, and the front-side electrode layer 400, it is sufficient if the display regions A1 to D1 are disposed in at least the design layer 202 according to the number disposed, position, size, shape and so on of the recesses 203A to 203D. That is, it is sufficient if the design layer 202 includes at least a portion of the display regions A1 to D1.

The on/off mode of the light sources 90A to 90D is not particularly limited. The interior member 1 may include a trigger sensor for turning on the light sources 90A to 90D. The light sources 90A to 90D may be always on. The light sources 90A to 90D may be turned on and off in conjunction with vehicle lights (such as an interior light or a headlight).

A design displayed on the first exposed part 20 by the display regions A1 to D1 (recesses 203A to 203D) is not particularly limited. Examples thereof include a design (at least one selected from a pattern, a letter, a shape, and a symbol) disposed as the "input position notification member" described above. The design displayed on the first exposed part 20 may be in a single color or in multiple colors. It is sufficient if the color or colors are exhibited on the first exposed part 20 by at least one selected from the skin layer 200, the intermediate layer 201, the design layer 202, and the light sources 90A to 90D.

The light transmitting property of the skin layer 200 and the intermediate layer 201 is not particularly limited. The skin layer 200 and the intermediate layer 201 may be colorless transparent, colored transparent, or semitransparent. The design layer 202 may not have a light non-transmitting property. That is, it is sufficient if the design layer 202 has a lower light transmitting property than the intermediate layer 201. The color (hue, saturation, or brightness) of the skin layer 200, the intermediate layer 201, the design layer 202, and the light sources 90A to 90D is not particularly limited. The luminance of the light sources 90A to 90D is not particularly limited.

The type, number disposed, and position of the light sources 90A to 90D are not particularly limited. The light sources 90A to 90D may be organic EL sheets, inorganic EL sheets, phosphorescent sheets, or the like. The light source part 9 may include the light sources 90A to 90D and a light guide plate (for example, an acrylic plate). The light sources 90A to 90D may be disposed adjacent to the first base material 80 in a plane direction to cause a front surface of the first base material 80 to emit light from the surface.

The interior part in which the interior member 1 is disposed is not particularly limited. Examples thereof include a door trim, a seat, a floor, a ceiling, an instrument panel, a glove box, a steering wheel, a center console, and a register. An installation surface of the interior member 1 in the interior part may be a flat surface or a curved surface. A direction (front-back direction) in which the interior member 1 is installed is not particularly limited. The interior member 1 may be disposed in an interior part of, other than vehicles, a ship, an aircraft, a building, or a house.

A layer configuration of the interior member 1 is not particularly limited. Of the first skin material 2, the sensor part 4, the flexible part 7, and the base 8, another layer may be interposed between two layers adjacent in the front-back direction. The same applies to configurations within each layer (for example, the configurations of the skin layer 200, the intermediate layer 201, and the design layer 202 within the first exposed part 20 of the first skin material 2). Another layer may be disposed on the front side of the first skin material 2. The same applies to the second skin material 3. In the above embodiments, the skin material is composed of two divided bodies (first skin material 2 and second skin material 3), but the number of divided bodies is not particularly limited.

[Regarding Material]

The material of the skin layers 200, 210 and the second skin material 3 is not particularly limited. Examples thereof include synthetic leather, resin, elastomers, nonwoven fabrics, and various fabrics (such as woven fabrics and knitted fabrics). Specific examples of synthetic leather, resin, and elastomers include acrylic, polyethylene terephthalate, polycarbonate, polyvinyl chloride, silicone, epoxy, polyurethane, styrene-based thermoplastic elastomers, olefin-based thermoplastic elastomers, and dynamic crosslinking thermoplastic elastomers. Examples of nonwoven fabrics and various fabrics include polyester, polypropylene, nylon, and cotton. The skin layers 200, 210 and the second skin material 3 may contain a coloring agent (such as colored polyethylene), a light diffusing agent (such as silicone, acrylic, and titanium oxide), and a light absorbing agent (such as titanium black and carbon black).

The material of the intermediate layers 201 and 211 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. The intermediate layers 201 and 211 may contain the coloring agent, light diffusing agent, and light absorbing agent described above.

The material of the design layers 202 and 212 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. The design layers 202 and 212 may contain the coloring agent, light diffusing agent, and light absorbing agent described above.

The material of the first flexible layer 70 and the second flexible layer 71 is not particularly limited. Examples thereof include elastomers such as styrene-based thermoplastic elastomers, olefin-based thermoplastic elastomers, and dynamic crosslinking thermoplastic elastomers, and foam such as polyurethane foam. In the case where the first flexible layer 70 includes the through holes 700A to 700D, the light transmitting property due to the material is not required.

Regarding the sensors 4A to 4D, the material of the insulation layer (insulation layers 401 and 411) is not particularly limited. The thermoplastic elastomer for the insulation layer is not particularly limited, and may be appropriately selected from styrene-based, olefin-based, vinyl chloride-based, urethane-based, ester-based, and amide-based elastomers. One type or two or more types of thermoplastic elastomers may be used. Examples of the styrene-based thermoplastic elastomer include styrene-butadiene-styrene block copolymer (SBS), styrene-ethylene-butylene-styrene block copolymer (SEBS), and styrene-ethylene-propylene-styrene block copolymer (SEPS). Examples of the olefin-based elastomer include, in addition to ethylene ethyl acrylate (EEA), ethylene methyl acrylate (EMA), and ethylene methyl methacrylate copolymer (EMMA), copolymer (ethylene-octene copolymer) of ethylene and α-olefin.

Rubber, resin, or foam other than thermoplastic elastomers may be used for the insulation layer. Examples thereof include: rubber such as ethylene propylene rubber (ethylene propylene copolymer (EPM) or ethylene propylene diene terpolymer (EPDM)), or resin such as acrylic, polyethylene terephthalate, polycarbonate, polyvinyl chloride, silicone, polyester, and epoxy, and foam such as polyurethane foam.

The material of the conductive layer (front-side conductive layer (front-side electrode layer 400 and front-side wiring layer 410) and back-side conductive layer (back-side electrode layer 402 and back-side wiring layer 412)) is not particularly limited. The conductive layer preferably has conductivity and is flexible. Examples of the material of the conductive layer include conductive rubber and conductive cloth.

The conductive rubber includes an elastomer and a conductive material. As the elastomer, at least one selected from crosslinked rubbers such as acrylic rubber, silicone rubber, urethane rubber, urea rubber, fluororubber, nitrile rubber, and hydrogenated nitrile rubber, and thermoplastic elastomers may be used. The conductive material may be appropriately selected from among: metal particles made of silver, gold, copper, nickel, rhodium, palladium, chromium, titanium, platinum, iron, and alloys thereof; metal oxide particles made of zinc oxide, titanium oxide or the like; metal carbide particles made of titanium carbonate or the like; metal nanowires made of silver, gold, copper, platinum, nickel, or the like; and conductive carbon materials such as carbon black, carbon nanotube, graphite, thin layer graphite, and graphene. The conductive rubber may contain a crosslinking agent, a crosslinking accelerator, a dispersant, a reinforcing material, a plasticizer, an anti-aging agent, a coloring agent, or the like.

As the conductive cloth, a woven fabric, a nonwoven fabric, or the like of conductive fibers may be used. Examples of the conductive fibers include those obtained by plating highly conductive copper, nickel, or the like on polyester fibers such as polyethylene terephthalate (PET).

The material of the first base material 80 and the second base material 81 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. In order to ensure the shape retention of the interior member 1, it is sufficient if the first base material 80 and the second base material 81 are harder than the other layers (first skin material 2, second skin material 3, sensor part 4, first flexible layer 70, and second flexible layer 71).

A member (for example, base 8, flexible part 7, and sensor part 4) interposed between the light sources 90A to 90D and the display regions A1 to D1 may have a light transmitting property or a light diffusing property. A method for imparting the light diffusing property to these members is not particularly limited. For example, in a transparent base material, a light diffusing agent (such as silicone, acrylic, or titanium oxide) having a different refractive index from the base material may be dispersed. These members may have a light introduction hole.

A method for laminating the skin layer 200, the intermediate layer 201, and the design layer 202 in the first skin material 2 shown in FIG. 4 is not particularly limited. Screen printing, gravure printing, inkjet printing, flexo printing or the like may be used. The layers may be laminated by bonding, vapor deposition or the like. The same applies to a method for laminating the skin layer 210, the intermediate layer 211, and the design layer 212. A method for forming the recesses 203A to 203D with respect to the first skin material 2 is not particularly limited. Laser processing, photoetching or the like may be used.

A method for fixing the sensors 4A to 4D, the first skin material 2 and the first flexible layer 70 shown in FIG. 3 is not particularly limited. For example, in the case where the installation surface of the interior member 1 in the interior part (instrument panel 92 shown in FIG. 1) is a convex surface that bulges out to the front side, another layer (first flexible layer 70, sensors 4A to 4D, and first skin material 2) outside a radius of curvature of the curve come into pressure contact with the base 8 inside the radius of curvature. The sensors 4A to 4D, the first skin material 2 and the first flexible layer 70 can be fixed using the pressure contact force. In contrast, in the case where the installation surface of the interior member 1 in the interior part is a concave surface that bulges out to the back side, the pressure contact force described above does not act. In this case, the sensors 4A to 4D, the first skin material 2 and the first flexible layer 70 can be fixed using adhesive, double-sided tape or the like.

The invention claimed is:

1. An interior member comprising:
   a first skin material comprising:
   a first exposed part, exposed to a cabin interior; and
   a first embedded part, embedded on a cabin exterior side from the first exposed part;
   a second skin material comprising:
   a second exposed part, exposed to the cabin interior and adjacent to the first exposed part; and
   a second embedded part, embedded on the cabin exterior side from the second exposed part and joined to the first embedded part;
   a transducer comprising:
   a main body, disposed directly back of the first exposed part; and
   a wiring part, disposed directly back of at least the first embedded part and electrically connected to the main body, wherein
   an end of the wiring part is disposed on the cabin exterior side of the first embedded part; and
   a first stitch, suturing the first embedded part and the second embedded part while sewing the wiring part on a back surface of the first embedded part.

2. The interior member according to claim 1, wherein
the transducer is a sensor that detects a predetermined physical quantity input from a cabin interior side and transmits an electric signal corresponding to the physical quantity.

3. The interior member according to claim 1, further comprising:
a second stitch, disposed in the first exposed part and tactilely recognizable from a front side, wherein
the second stitch is disposed between a boundary and the main body as seen from the front side, the boundary being between the first exposed part and the second exposed part.

4. The interior member according to claim 3, wherein
the wiring part is further disposed directly back of the first exposed part; and
the second stitch sews the wiring part on the first exposed part.

5. The interior member according to claim 1, further comprising:
a flexible part, disposed on a back side of the first skin material, the second skin material, and the transducer, wherein
the end of the wiring part is disposed on the cabin exterior side of the flexible part.

6. The interior member according to claim 5, wherein
the main body comprises an input region where a predetermined physical quantity is input;
the flexible part comprises a first region disposed on the back side of the input region, a second region adjacent to the first region, a high hardness region, and a low hardness region lower in hardness than the high hardness region; and
at least one of (a) and (b) below is satisfied:
(a) one of the first region and the second region is the high hardness region and the other is the low hardness region; and
(b) one of the two first regions comprised in the flexible part is the high hardness region and the other is the low hardness region.

7. The interior member according to claim 6, wherein
the high hardness region and the low hardness region are different in material.

8. The interior member according to claim 7, wherein
at least one of the high hardness region and the low hardness region is made of a foam impregnated with resin.

9. The interior member according to claim 6, wherein
the high hardness region and the low hardness region are different in thickness in a front-back direction.

10. The interior member according to claim 6, wherein
at least one of the high hardness region and the low hardness region comprises a through hole that penetrates the interior member in a front-back direction.

11. An interior member comprising:
a first skin material comprising:
a first exposed part, exposed to a cabin interior; and
a first embedded part, embedded on a cabin exterior side from the first exposed part;
a second skin material comprising:
a second exposed part, exposed to the cabin interior and adjacent to the first exposed part; and
a second embedded part, embedded on the cabin exterior side from the second exposed part and joined to the first embedded part;
a transducer comprising:
a main body, disposed directly back of the first exposed part; and
a wiring part, disposed directly back of at least the first embedded part and electrically connected to the main body, wherein an end of the wiring part is disposed on the cabin exterior side of the first embedded part; and
a flexible part, disposed on a back side of the first skin material, the second skin material, and the transducer, wherein the end of the wiring part is disposed on the cabin exterior side of the flexible part, wherein
the main body comprises an input region where a predetermined physical quantity is input;
the flexible part comprises a first region disposed on the back side of the input region, a second region adjacent to the first region, a high hardness region, and a low hardness region lower in hardness than the high hardness region;
at least one of (a) and (b) below is satisfied:
(a) one of the first region and the second region is the high hardness region and the other is the low hardness region; and
(b) one of the two first regions comprised in the flexible part is the high hardness region and the other is the low hardness region; and
the first exposed part comprises: a skin layer, having a light transmitting property; an intermediate layer, disposed on the back side of the skin layer and having a lower light transmitting property than the skin layer; a design layer, disposed on the back side of the intermediate layer and having a lower light transmitting property than the intermediate layer; and a recess, opening on at least one of a front surface and a back surface of the design layer;
the first exposed part comprises a display region formed by the recess and displaying a predetermined design on a front surface of the first exposed part by light irradiated from the back side;
as seen from a front side, the input region and the first region are disposed around the display region, and the second region is disposed in the display region; and
the second region comprises a light introduction hole that introduces the light.

* * * * *